United States Patent
Nakamura

(10) Patent No.: US 6,993,194 B2
(45) Date of Patent: Jan. 31, 2006

(54) METHOD AND APPARATUS FOR DETECTING ERRORS IN IMAGE READING

(75) Inventor: Yohji Nakamura, Atsugi (JP)

(73) Assignee: International Business Machines Corporation, Armonk, NY (US)

(*) Notice: Subject to any disclaimer, the term of this patent is extended or adjusted under 35 U.S.C. 154(b) by 812 days.

(21) Appl. No.: 09/867,905

(22) Filed: May 30, 2001

(65) Prior Publication Data

US 2002/0051236 A1  May 2, 2002

(30) Foreign Application Priority Data

May 30, 2000  (JP)  .............. 2000-159354

(51) Int. Cl.
*G06K 9/36*  (2006.01)
(52) U.S. Cl. ............... 382/232; 382/309; 358/406
(58) Field of Classification Search ............ 358/405, 358/406, 504; 382/232, 309, 311
See application file for complete search history.

(56) References Cited

U.S. PATENT DOCUMENTS

| | | | | |
|---|---|---|---|---|
| 5,048,104 A | * | 9/1991 | D'Aoust et al. | 382/293 |
| 5,406,428 A | * | 4/1995 | Suzuki | 360/53 |
| 5,832,126 A | * | 11/1998 | Tanaka | 382/239 |
| 6,606,415 B1 | * | 8/2003 | Rao | 382/239 |

\* cited by examiner

*Primary Examiner*—Thomas D. Lee
(74) *Attorney, Agent, or Firm*—Daniel P. Morris, Esq.; Perman & Green, LLP.

(57) ABSTRACT

A method and apparatus used to detect errors in image reading simply and quickly. Information derived from image data (such as the amount of data and a compression ratio) after compression is compared with reference values previously determined in connection with errors in image reading, and the existence of errors in image reading is determined. When the data size is used, it is judged that there is an error in image reading when the data size after compression is smaller than the reference value previously determined. When the compression ratio of the image data is used, it is judged that there is an error of image reading in the case where the compression ratio is larger than the reference value previously determined.

16 Claims, 2 Drawing Sheets

METHOD AND APPARATUS FOR DETECTING ERRORS IN IMAGE READING

BACKGROUND OF THE INVENTION

1. Field of the Invention

The present invention relates to a method and an apparatus for detecting errors in image reading. More specifically, it relates to a method for detecting errors in image reading from image data read out by an image reader.

2. Background Art

A large number of automatic contract apparatus, such as ACMs and ATMs comprise an image reader utilizing an image scanner, a CCD camera and the like in order to confirm the contents of the contract and the like by image information.

Some of the image readers have a function which facilitates self-diagnosis of the existence of malfunctions of the image reader itself. However, the image reader cannot detect all of the malfunctions particularly due to external causes such as a breakdown of a lamp of the image scanner, inadequate setting of documents having a read-out image, troubles with the CCD camera, defects in wiring connections and the like.

Accordingly, there has heretofore been no way to detect such malfunctions of the image reader itself other than to confirm the malfunctions by utilizing the services of an operator who observes image information transmitted to a central operation center from an automatic contract apparatus through a communication line. However, since it takes a long time to transmit the image information in this way, the malfunctions of the image reader cannot be detected instantaneously. Furthermore, since the operator confirms the malfunctions of the image reader with his or her own eyes, it cannot be said that his or her judgment is always correct. As a result, when the malfunctions of the image reader occur, it is sometimes impossible to execute rereading of the image instantly at that moment, and the ability to obtain information may be postponed or lost.

SUMMARY OF THE INVENTION

It is an object of the present invention to detect errors of image reading simply and quickly.

It is another object of the present invention to detect malfunctions of an image reader simply and quickly.

It is still another object of the present invention to provide a method for detecting errors of image reading from image data read out by an image reader simply and quickly, and to provide an apparatus for detecting the same simply and quickly.

The present invention is directed to a method of detecting errors of image reading from image data information read out, particularly, errors of image reading due to malfunctions of the image reader, and to an apparatus of detecting the same. The present invention has a feature in that image data information (data size or compression ratio) after compression is compared with reference values previously determined in connection with errors of image reading, so as to make a judgement as to whether there are or are not errors in image reading. When the data size is used as the image data information, it is decided that there is an error of image reading when the data size after compression is smaller than the previously determined reference value. Furthermore, when the data compression ratio is used as the image data information, it is decided that there is an error of image reading when the compression ratio is larger than the previously determined reference value. The method and the apparatus of the present invention make it possible to detect errors of image reading simply and quickly.

According to the method and the apparatus of the present invention, since errors of image reading are detected by comparing the information of the compressed image data (such as a data size and a compression ratio) and the previously determined reference values (such as a data size and a compression ratio), existence of errors of image reading can be judged simply and quickly. In addition, errors of image reading can be detected automatically without any manpower. As a result, when errors of image reading occur, it is possible to execute rereading of the image instantly on the spot, then and there or to use substitute image reading means.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
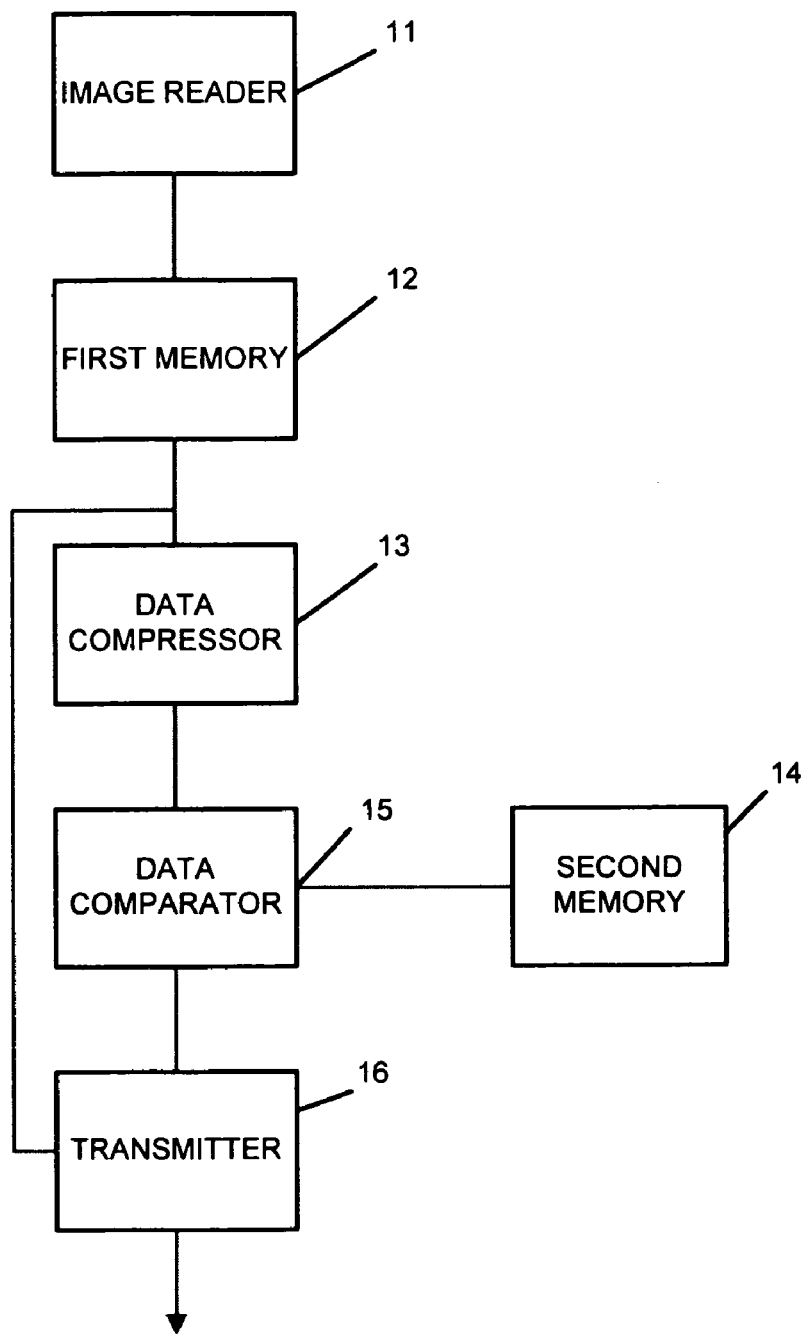
FIG. 1 is a block diagram of an arrangement of an image reading error detection apparatus of the present invention.

An embodiment of the present invention will be described with reference to FIG. 1 and FIG. 2 below. FIG. 1 is a block diagram showing an apparatus for detecting errors of image reading according to one embodiment of the present invention. The apparatus of FIG. 1 comprises an image reader 11, storing means, such as a first memory 12 for storing image data read out by the image reader 11, image data compression means such as a data compressor 13, storing means, such as a second memory 14 for storing a plurality of reference values previously determined, comparison judging means or a data comparator 15, and transmission means or transmitter 16. In accordance with the invention, transmitter means 16 may be omitted.

Figure 2:
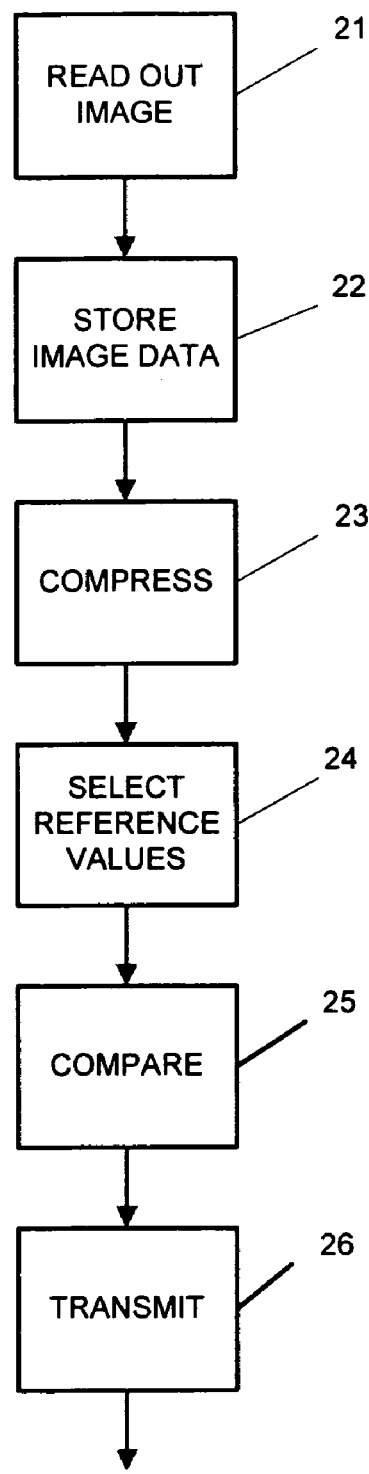
FIG. 2 is a flowchart for detecting errors of image reading in the present invention.

FIG. 2 is a flowchart showing a method of detecting errors of image reading according to one embodiment of the present invention. An image which is needed, is read out by the image reader 11 (step 21). The image reader 11 may include various kinds of imaging devices such as an image scanner and a CCD camera. The image data read out is stored in the data storing means or first memory 12 as digital information (step 22). The stored image data (digital information) is compressed and held in the image data compression means or data compressor 13 (step 23). The compression is executed according to an image compression method such as MMR, GIF and JPEG.

A reference value corresponding to the image data that was read out in step 21 from the second memory 14 for storing the plurality of reference values previously determined is selected (step 24). A table having a plurality of reference values is, for example, used in the second memory 14 for storing the reference values. The reference values (which are previously determined so as to correspond to images with errors in image reading) are values of data size (memory capacity) and data compression ratio. A suitable reference value is selected in accordance with size information relating to an image to be read out, that is, A4 size or B5 size; color information such as binary data for black and white, existence of gradation and/or full color; and image resolution. The comparison judging means or data comparator 15 compares the selected reference value with the compressed image data (step 25).

The comparison and the determination or judgment in step 25 are executed, for example, in the following manner. In image reading, when errors of image reading occur due to, for example, a breakdown of a lamp built into an image scanner, erroneous setting or placement of documents having an image to be read out, difficulties with a CCD camera, defects in wiring connections and the like, an image in which the whole area is black or white, or an image analogous to such an image, results. Since data compression is executed based on regularity of an image in image compression methods such as MMR, GIF and JPEG, an extremely large (high) compression ratio is often obtained in the case where an entire region or area of the image is black or white. In other words, the data size after compression becomes small; that is the data file is small.

For example, in the case of an image where the image size is A4, the color information is binary data of black and white, and the resolution is 300 dpi, a data size of an image normally read out is 20 to 30 KB or more, after compression. However, contrary to this result, an image with an entire region or area, which is black or white due to an error of image reading has a data size of 2 to 3 KB after compression. Both images have data sizes different by about a single figure, or order of magnitude, from each other. For example, 10 KB is selected as the reference value (threshold) for an error in which the entire region or area of the read image turns all black or white. When the data size of the read image is larger than 10 KB (20 to 30 KB), it may be judged that there is no error of image reading. On the other hand, when the data size of the read image is smaller than 10 KB (for example 2 to 3 KB), it can be judged that there is an error of image reading. In general, the reference values may be determined by adding a necessary margin to the information values (such as a data size and a compression ratio) after compression of the image data read out under various kinds of reading errors.

The existence of errors of image reading may be transmitted to, for example, a central operation center by the transmission means 16 through a communication line (step 26). The detection of errors of image reading as shown in FIGS. 1 and 2 can be applied to, for example, an automatic contract apparatus such as an ACM and an ATM. In other words, the arrangement of FIG. 1 can be built into the automatic contract apparatus. It will be understood that applications of the method and the apparatus of the present invention are not limited to an automatic contract apparatuses. The method and the apparatus of the present invention can be widely used for systems (for example, image recognition devices such as a copying machine and a facsimile machine) which have an image input (reading-out) device.

It should be understood that the foregoing description is only illustrative of the invention. Various alternatives and modifications can be devised by those skilled in the art without departing from the invention. For example, while various memories have been mentioned in the above description, these memories can be in various parts of a single memory and may merely represent various memory locations. Further, the invention may be implemented with various hardware or software configurations, as may be desired. Accordingly, the present invention is intended to embrace all such alternatives, modifications and variances which fall within the scope of the appended claims.

What is claimed is:

1. A method for detecting errors in image reading from image data of an image which has been read, said method comprising the steps of:
    compressing the image data;
    comparing a data size of the compressed image data or a compression ratio of the compressed image data and reference values previously determined in connection with an error in image reading; and
    determining existence of an error in image reading based on said comparing when the data size of the compressed image data is smaller than a data size previously determined as the reference value or a compression ratio of the compressed image data is larger than a compression ratio previously determined as the reference value.

2. The method according to claim 1, further comprising: using an image reader to read the image and obtain said image data.

3. The method according to claim 2, further comprising: storing data of the image read by the image reader.

4. The method according to claim 1, further comprising the step of transmitting an error signal when it is judged that there is an error in image reading.

5. The method according to claim 4, wherein said error signal is transmitted to a central location.

6. A method for detecting errors in image reading from image data of an image which has been read, said method comprising the steps of:
    compressing the image data;
    comparing values associated with the compressed image data and reference values previously determined in connection with an error in image reading;
    determining existence of an error in image reading based on said comparing;
    selecting a reference value corresponding to said image data read out from a reference value table having a plurality of reference values previously determined in connection with errors in image reading; and
    comparing said selected reference values and said read out image data after compression with each other.

7. A method for detecting errors in image reading from image data of an image which has been read, comprising:
    compressing the image data;
    comparing values associated with the compressed image data and reference values previously determined in connection with an error in image reading; and
    determining existence of an error in image reading based on said comparing;
    wherein said error in image reading is due to malfunction of an image reader used to read the image.

8. An apparatus for detecting an error in image reading from image data of an image which has been read, comprising:
    an image reader;
    a first memory for storing image data read out by said image reader;
    a data compressor for compressing the image data stored in said memory for the image data and for holding the compressed image data therein;
    a second memory for storing a plurality of reference values previously determined in connection with the error in image reading; and
    a selector for selecting a reference value corresponding to said image data read out from said second memory, and for determining existence of the error in image reading by comparing the selected reference value with said compressed image data.

9. The apparatus according to claim 8, wherein said second memory includes a table having the plurality of reference values.

10. The apparatus according to 8, further comprising a transmitter for transmitting the existence of an error in image reading.

11. The apparatus according to 10, wherein said transmitter transmits a signal indicating said error to a remote location.

12. The apparatus according to claim 8, wherein said image reader is built into an automatic contract apparatus.

13. The apparatus of claim 12, wherein said automatic contract apparatus is one of an automatic cash machine and an automatic teller machine.

14. The apparatus of claim 12, in combination with said automatic contract apparatus.

15. The apparatus of claim 14, wherein said automatic contract apparatus is one of an automatic cash machine and an automatic teller machine.

16. The apparatus of claim 8, wherein said image reader includes at least on of an image illumination lamp, a CCD camera, and a document handling device.

\* \* \* \* \*